United States Patent Office 3,391,193
Patented July 2, 1968

3,391,193
PURIFICATION OF METHACRYLALDEHYDE
Donald M. Coyne, Prairie Village, Kans., and Richard H. Havens, Kansas City, Mo., assignors to Gulf Research & Development Company, Pittsburgh, Pa., a corporation of Delaware
No Drawing. Filed Feb. 18, 1966, Ser. No. 528,400
8 Claims. (Cl. 260—601)

This invention relates to the purification of acrylic aldehydes and in particular to the removal of isobutyraldehyde present as an impurity in methacrylaldehyde.

Methacrylaldehyde (commonly called methacrolein) may be manufactured by vapor phase oxidation of 2-methylpropene (isobutylene). Ordinarily the hot gaseous oxidation product is scrubbed with water to recover a crude aqueous condensate product mixture by combined solvent and cooling effects. The crude mixture obtained from scrubbing is then distilled to yield a mixture containing from about 80 percent to about 95 percent methacrylaldehyde along with a number of impurities. By way of illustration, such a mixture may consist principally of the components listed below and in the proportions indicated.

| Chemical | Boiling Point (° C.) | Estimated wt. percent |
|---|---|---|
| Methacrylaldehyde | 68.4 | 89.30 |
| Acetaldehyde | 20.2 | 0.98 |
| Water | 100 | 1.93 |
| Propionaldehyde | 49.5 (740 mm.) | 0.26 |
| Acetone-Acrolein mixture | 56.2/52.8 | 2.27 |
| Isobutyraldehyde | 63–64 (757 mm.) | 0.98 |
| 2-Butanone | 79.6 | 0.21 |
| Diacetyl | 87–88 | 1.70 |
| Methallyl alcohol | 115–116 (757 mm.) | 0.31 |
| Total | | 97.94 |

The values given for concentrations of impurities may be taken as representative. In the case of acetone and acrolein which are not easily separated from each other, an estimate is given only of their combined proportions. The difficulty of the purification problem becomes readily apparent when the boiling points of the various substances are compared. Where the differences are large, separation by distillation is feasible. However, it will be noticed that the boiling points of pure methacrylaldehyde and isobutyraldehyde differ by only about five degrees. Actually, the problem is more difficult than it appears at first glance, because in the presence of water both of these substances form azeotropes, which unfortunately have boiling points differing by less than one degree C. The comparison of boiling points and structural formulas of these compositions is as follows:

| Formula | B.P. (pure) | B.P. (azeotrope) |
|---|---|---|
| $\text{H}_2\text{C}=\overset{\overset{\text{CH}_3}{\mid}}{\text{C}}-\overset{\overset{\text{H}}{\mid}}{\text{C}}=\text{O}$ | 68.0° C. | 63.6° C. (7.7% water). |
| $\text{H}_3\text{C}-\overset{\overset{\text{CH}_3}{\mid}}{\text{C}\text{H}}-\overset{\overset{\text{H}}{\mid}}{\text{C}}=\text{O}$ | 64.5° C. | 60.5° C. (6.0% water). |

When separation of wet product is attempted by distillation, the methacrylaldehyde azeotrope distills off in combination with isobutyraldehyde and isobutyraldehyde azeotrope, causing prohibitive product losses. Even when the product is perfectly dry, very expensive equipment and very high reflux ratios are necessary for the separation and removal of isobutyraldehyde by distillation.

The problem presented by the presence of isobutyraldehyde remains unsolved, so far as commercial manufacture is concerned. Commercial highly purified methacrylaldehyde sold under the designation "99.5% methacrolein" is found to contain from 0.5 to 1.0 percent isobutyraldehyde.

Methacrylaldehyde possesses some utility as a polymerizable monomer, but this utility is limited by the presence of isobutyraldehyde. At present, the principal use for methacrylaldehyde is as a starting material for production of polymerizable esters such as methyl methacrylate. However, the methacrylate ester made from methacrylaldehyde is less desirable as a polymerizable substance because it may contain as much as two percent methyl isobutyrate as an impurity.

Methacrylaldehyde contains besides a reactive aldehyde group a reactive double bond which undergoes polymerization, addition, Diels-Alder and other familiar reactions. Because of the greater reactivity of methacrylaldehyde it has not appeared feasible in the past to remove isobutyraldehyde therefrom by chemical methods. However, by the process of this invention isobutyraldehyde is subjected to a chemical reaction in the presence of methacrylaldehyde and is selectively removed.

Briefly, the process may be described as comprising the following steps:

(a) reacting isobutyraldehyde in the presence of methacrylaldehyde with an acidic condensing agent selected from the group consisting of soluble arylsulfonic acids and alkylsulfonic acids, hydrochloric acid, phosphorus pentoxide, and polyphosphoric acid of from about 75 percent to 85 percent $P_2O_5$ content under homogeneous liquid phase conditions at a temperature below about 150° C. to yield a reaction product mixture containing a condensation product of isobutyraldehyde having a higher molecular weight and lower vapor pressure than either methacrylaldehyde or isobutyraldehyde; and (b) separating the reaction product mixture obtained in step (a) to yield methacrylaldehyde substantially free from isobutyraldehyde.

The method may be better understood by reference to the following illustrative examples.

EXAMPLE I

A 5 percent solution of isobutyraldehyde in methacrylaldehyde is prepared. A 100 ml. portion of this solution is refluxed for 1.5 hours in the presence of 1 g. of p-toluene sulfonic acid monohydrate. At the end of this time the solution is analyzed by gas-liquid chromatography. Results of analysis show that about 73.8 percent of the isobutyraldehyde has disappeared and that the methacrylaldehyde content remains essentially unchanged. The isobutyraldehyde content is further reduced by continued refluxing and substantially pure methacrylaldehyde is obtained by distillation from the reaction mixture.

EXAMPLE II

Two 100 ml. samples of methacrylaldehyde containing 2 percent isobutyraldehyde are refluxed for 3 hours with different acidic condensing agents, for purposes of comparison. The solution is then analyzed by gas-liquid chromatography. The results are tabulated below.

| Acid Condensing Agent | Quantity | Percent of Isobutyraldehyde Removed | Percent of Methacrylaldehyde Recovered |
|---|---|---|---|
| Benzenesulfonic acid (90% purity). | 1 g | 99.1 | 95.0 |
| Methanesulfonic acid | 0.4 ml | 82.0 | 94.2 |

EXAMPLE III

One liter of methacrylaldehyde containing two percent isobutyraldehyde is refluxed for 1.5 hours with 10 g. of benzenesulfonic acid. One-half of this product solution is then distilled by adding it continuously to 250 ml. water at 90–95° C. in a simple distillation apparatus. The water azeotrope of methacrylaldehyde is continuously distilled and collected by this technique, the condensation product of isobutyraldehyde remaining in the distillation pot. An organic phase amounting to 460 ml. and an aqueous phase amounting to 43 ml. are obtained as distillate, leaving 31.8 g. of organic residue in the still pot. Analysis indicates the removal of 92.4% of the isobutyraldehyde and recovery of 96.8% of the methacrylaldehyde.

EXAMPLE IV

One liter of the crude (about 81 percent) methacrylaldehyde containing 2.43 percent isobutyraldehyde obtained by scrubbing gaseous isobutylene oxidation product is refluxed with 10 g. of benzenesulfonic acid for 1.5 hours. One-half of this product solution is then distilled by adding it continuously to 250 ml. of water at 90 to 95° C., yielding 425 ml. of organic phase and 39 ml. of aqueous phase. Methacrylaldehyde containing only 0.55 percent isobutyraldehyde is recovered in 92.6 percent yield. Analysis indicates that 80.8 percent of the isobutyraldehyde is removed from the crude methacrylaldehyde.

EXAMPLE V

Into a three-necked 200 ml. flask equipped with thermometer, reflux condenser, magnetic stirrer and a rubber septum for sample removal is introduced 1 g. of commercial polyphosphoric acid containing 83.2 percent $P_2O_5$ and consisting of a mixture of orthophosphoric and polyphosphoric acids. To the acid there is added, with stirring, 100 ml. of methacrylaldehyde containing 2 percent isobutyraldehyde. The acid is observed to disperse but not completely dissolve in the impure methacrylaldehyde at room temperature. As the temperature is increased to reflux, an apparently homogeneous solution is obtained. The mixture is maintained at reflux and samples are removed and analyzed periodically for both methacrylaldehyde and isobutyraldehyde. Typical results are tabulated below:

| Refluxing time | 1 hour | 2 hours | 3 hours |
|---|---|---|---|
| Methacrylaldehyde recovery, percent | 99.3 | Unchanged | |
| Isobutyraldehyde removed, percent | 72.3 | 84.3 | 84.8 |

EXAMPLE VI

Example V is repeated with the exception that the quantity of polyphosphoric acid is increased to 5.0 g. and the mixture is initially allowed to stand 1 hour at room temperature, after which the results are as follows:

|  | Percent |
|---|---|
| Methacrylaldehyde recovered | 98.7 |
| Isobutyraldehyde removed | 89.5 |

Then after refluxing for one hour, 96.3 percent of the isobutyraldehyde is removed.

EXAMPLE VII

Example V is repeated with the exception that for the acid condensing agent there is substituted 5 ml. of concentrated hydrochloric acid. An apparently homogeneous solution is obtained on refluxing. Samples are taken and analyzed after 1 hour and after 2 hours of refluxing. Typical results appear below:

| Refluxing time | 1 hour | 2 hours |
|---|---|---|
| Methacrylaldehyde recovered, percent | 100 | 98.7 |
| Isobutyraldehyde removed, percent | 74.2 | 89.5 |

EXAMPLE VIII

In a three-necked 200 ml. flask equipped with thermometer, reflux condenser, magnetic stirrer and a rubber septum for sample removal is placed 100 ml. of methacrylaldehyde containing 2 percent isobutyraldehyde. Stirring is begun and 1 g. of powdered phosphorus pentoxide is added. While stirring at room temperature, the phosphorus pentoxide dissolves with the evolution of sufficient heat to raise the temperature of the reaction mixture about 3° C., followed by a return to room temperature after about three hours of continuous stirring. The mixture is then allowed to stand at room temperature until a total reaction time of 24 hours has elapsed. Samples are taken at intervals and analyzed by gas-liquid chromatography. Illustrative data are given below:

Isobutyraldehyde removal:

|  | Percent |
|---|---|
| 1 hr. | 18 |
| 2 hrs. | 55 |
| 6 hrs. | 66.5 |
| 24 hrs. | 84 |

The above experiment is repeated with the exception that the mixture is heated to hasten solution of the phosphorus pentoxide and the mixture is then refluxed until a total reaction time of 3 hours has elapsed. Samples are taken at intervals and analyzed by gas-liquid chromatography. Illustrative data are presented below:

Isobutyraldehyde removal:

|  | Percent |
|---|---|
| 15 min. | 44 |
| 30 min. | 62.5 |
| 1 hr. | 79.3 |
| 1.5 hr. | 86.4 |
| 2 hrs. | 90 |
| 3 hrs. | 94.6 |

Example IX

A 100 ml. portion of a 2 percent solution of isobutyraldehyde in methacrylaldehyde is refluxed with 1 g. of xylenesulfonic acid (technical grade) in the apparatus described in Example V and samples of the reaction mixture are taken at intervals and analyzed by gas-liquid chromatography. Results are listed below.

| Reflux time | Methacrylaldehyde, Percent recovery | Isobutyraldehyde, Percent removal |
|---|---|---|
| 1 hour | 98 | 69.5 |
| 2 hours | 100 | 89.9 |
| 3 hours | 96 | 95.2 |

Discussion

The examples presented herein have been selected so as to illustrate the maximum number of features of the process.

Example I illustrates the use of one of the preferred acid condensing agents to effect rapid removal of isobutyraldehyde with minimum loss of methacrylaldehyde.

Example II demonstrates that there are differences in the effectiveness and in product losses between different organic sulfonic acids as condensing agents, when compared in approximately equimolar quantities.

Examples III and IV illustrate the effectiveness of a preferred condensing agent, both on a very crude methacrylaldehyde product and one which contains 2 percent isobutyraldehyde as the only impurity. Example IV also illustrates a preferred method of separation, by a combination of dilution with water and distillation of the water azeotrope of methacrylaldehyde.

Example V demonstrates that the rate of disappearance of isobutyraldehyde diminishes with decreasing concentration over a period of time, tending to level off after reaching a low isobutyraldehyde concentration.

Example VI demonstrates that the rate of condensation of isobutyraldehyde also varies with the concentration of the acid condensing agent. Example VIII illustrates the use of phosphorus pentoxide alone as condensing agent and demonstrates the effect of temperature on reaction rate when this condensing agent is employed.

The examples taken as a group demonstrate the effectiveness of a variety of condensing agents in removing isobutyraldehyde while affecting the methacrylaldehyde concentration only slightly. The rate of isobutyraldehyde removal has been shown to follow a logarithmic curve, declining and tending to level off with decreasing isobutyraldehyde concentration. There is a perceptible disappearance of methacrylaldehyde, but as illustrated in the examples, under the recommended conditions the loss is very small. It is a reasonable objective to consider manufacturing 99.9 percent methacrylaldehyde by this process with product losses of 5 percent or less. However, at temperatures above 150° C. dimerization of methacrylaldehyde occurs at a rapid rate, resulting in prohibitive losses of product.

Upon becoming familiar with the process of the invention it will occur to a person having ordinary skill in the art that many variations and elaboration of the method should be feasible. However, before proceeding to make variations on the method of this invention, the critical nature of the acid condensing agent should be taken into consideration. It is obviously desirable to use a condensing agent which will be effective in low concentrations, is inexpensive and does not require prolonged reaction times. However, many common strong acids fail to give rates of reaction which are sufficiently high to make the process feasible, and some may cause intolerable product losses. Without speculation or theorizing as to the fundamental reasons for this behavior, there is presented below a list of common acids which are not recommended for use in the process because they do not perform well as condensing agents:

Sulfuric acid (both concentrated and dilute)
Orthophosphoric acid (less than one-third as effective as polyphosphoric)
Potassium bisulfate
Boron trifluoride-methanol mixture
Glacial acetic acid
Trichloroacetic acid
Zinc chloride
Dowex 50 (an insoluble, polymeric aromatic sulfonic acid)
Sodium bisulfite
Sulfamic acid
Phenylarsonic acid As the examples clearly demonstrate, the rate of disappearance of isobutyraldehyde diminishes with concentration, so that removal of the last traces of this substance can be accomplished within a reasonable length of time only by use of an effective condensing agent. When a preferred type of condensing agent is used, as illustrated in Example VIII, methacrylaldehyde of 99.9 percent purity may be obtained at reflux temperature with a residence time in the reactor of only about four hours. This process may be carried out either batchwise or continuously, and if desired may be repeated, with an intermediate step to separate partially purified product from the higher molecular weight condensation product. Recovery of the water azeotrope of methacrylaldehyde and disposal of the condensation product and acid condensing agent is readily accomplished by distillation in the presence of water in a single step, without the necessity of cooling the reaction mixture and with minimum energy requirements. This step also may be operated either batchwise or continuously. Other modifications and variations may be made within the scope of the invention.

What is claimed is:

1. The process for removing isobutyraldehyde from a mixture containing both isobutyraldehyde and methacrylaldehyde comprising the following steps:
   (a) reacting isobutyraldehyde in the presence of methacrylaldehyde with an acidic condensing agent selected from the group consisting of soluble aromatic and aliphatic sulfonic acids, hydrochloric acid, phosphorus pentoxide, and polyphosphoric acid of from about 75 percent to 85 percent $P_2O_5$ content under homogeneous liquid phase conditions at a temperature below about 150° C. to yield a reaction product mixture containing a condensation product of isobutyraldehyde having a higher molecular weight and lower vapor pressure than either methacrylaldehyde or isobutyraldehyde; and
   (b) separating the reaction product mixture obtained in step (a) to yield methacrylaldehyde substantially free from isobutyraldehyde.

2. The process for removing isobutyraldehyde from a mixture containing both isobutyraldehyde and methacrylaldehyde comprising the following steps:
   (a) reacting isobutyraldehyde in the presence of methacrylaldehyde with polyphosphoric acid of from about 75 percent to 85 percent $P_2O_5$ content under homogeneous liquid phase conditions at a temperature below about 150° C. to yield a condensation product of isobutyraldehyde having a higher molecular weight and lower vapor pressure than either methacrylaldehyde or isobutyraldehyde; and
   (b) distilling the reaction product mixture obtained in step (a) in the presence of water to yield methacrylaldehyde substantially free from isobutyraldehyde.

3. The process of claim 1 in which the acidic condensing agent is p-toluenesulfonic acid.

4. The process of claim 1 in which the acidic condensing agent is benzenesulfonic acid.

5. The process of claim 1 in which the acidic condensing agent is methanesulfonic acid.

6. The process of claim 1 in which the acidic condensing agent is xylenesulfonic acid.

7. The process of claim 1 in which the acidic condensing agent is hydrochloric acid.

8. The process for removing isobutyraldehyde from a mixture containing both isobutyraldehyde and methacrylaldehyde comprising the following steps:
   (a) reacting isobutyraldehyde in the presence of methacrylaldehyde with phosphorus pentoxide under homogeneous liquid phase conditions at a temperature below about 150° C. to yield a reaction product mixture containing a condensation product of isobutyraldehyde having a higher molecular weight and lower vapor pressure than either methacrylaldehyde or isobutyraldehyde; and
   (b) distilling the reaction product mixture obtained in step (a) in the presence of water to yield methacrylaldehyde substantially free from isobutyraldehyde.

No references cited.

BERNARD HELFIN, *Primary Examiner.*

R. H. LILES, *Assistant Examiner.*